(12) United States Patent
Eisenreich et al.

(10) Patent No.: US 9,817,858 B2
(45) Date of Patent: Nov. 14, 2017

(54) GENERATING HASH VALUES

(71) Applicants: Katrin Eisenreich, Dresden (DE); Holger Bischoff, Dielheim (DE)

(72) Inventors: Katrin Eisenreich, Dresden (DE); Holger Bischoff, Dielheim (DE)

(73) Assignee: SAP SE, Walldorf (DE)

( * ) Notice: Subject to any disclaimer, the term of this patent is extended or adjusted under 35 U.S.C. 154(b) by 373 days.

(21) Appl. No.: 14/565,715

(22) Filed: Dec. 10, 2014

(65) Prior Publication Data

US 2016/0171039 A1   Jun. 16, 2016

(51) Int. Cl.
*G06F 17/30* (2006.01)

(52) U.S. Cl.
CPC .......................... *G06F 17/30371* (2013.01)

(58) Field of Classification Search
CPC ......... G06F 17/30067; G06F 17/30949; G06F 17/3015
USPC ........................................ 707/698, 714, 737
See application file for complete search history.

(56) References Cited

U.S. PATENT DOCUMENTS

| | | | | |
|---|---|---|---|---|
| 5,920,900 | A * | 7/1999 | Poole | G06F 17/30949 |
| | | | | 707/E17.036 |
| 7,092,954 | B1 * | 8/2006 | Ramesh | G06F 17/30498 |
| | | | | 707/714 |
| 8,356,022 | B2 | 1/2013 | Eisenreich | |
| 8,473,474 | B1 | 6/2013 | Eisenreich | |
| 9,148,475 | B1 * | 9/2015 | Mealey | G06F 17/30277 |
| 2004/0172400 | A1 * | 9/2004 | Zarom | G06F 17/30982 |
| 2010/0161999 | A1 * | 6/2010 | Poovendran | H04L 9/3236 |
| | | | | 713/189 |
| 2010/0223671 | A1 * | 9/2010 | Tsuda | G06F 21/554 |
| | | | | 726/26 |
| 2011/0113190 | A1 * | 5/2011 | Acharya | H04L 69/12 |
| | | | | 711/108 |
| 2011/0119293 | A1 * | 5/2011 | Taylor | G06F 21/10 |
| | | | | 707/769 |
| 2013/0194271 | A1 | 8/2013 | Roesch et al. | |
| 2014/0122791 | A1 * | 5/2014 | Fingerhut | H04L 49/00 |
| | | | | 711/108 |
| 2014/0250125 | A1 * | 9/2014 | Stuempfle | G06F 17/30994 |
| | | | | 707/737 |

(Continued)

OTHER PUBLICATIONS

SAP Hana SQL and System Views Reference, SAP HANA Platform SPS 08, Document Version: 1.0—May 28, 2014; pp. 204-210.

*Primary Examiner* — Jeffrey A Burke
*Assistant Examiner* — Thong Vu
(74) *Attorney, Agent, or Firm* — Fish & Richardson P.C.

(57) ABSTRACT

The present disclosure involves systems, software, and computer implemented methods for generating a hash identifier. One example method includes: identifying a record to include in a table, the record associated with two or more primary key fields that are concatenated to create a concatenated key, wherein the table includes one or more hash columns for storing hash identifiers; applying a hash function to the concatenated key to create a new hash value; determining whether a record in the table has a hash value matching the new hash value; in response to determining that a hash value of a record matches the new hash value and the concatenated key of the identified record does not match the concatenated key of any existing record, adding a counter to the new hash value to generate a unique hash ID; and storing the record, including the unique hash ID, in the table.

20 Claims, 4 Drawing Sheets

(56) References Cited

U.S. PATENT DOCUMENTS

2015/0288665 A1* 10/2015 El Emam ............ H04L 63/0435
713/171
2016/0182678 A1* 6/2016 Wang .................. H04L 67/1008
707/737

* cited by examiner

GENERATING HASH VALUES

TECHNICAL FIELD

The present disclosure relates to computer-implemented methods, software, and systems for generating a unique hash identifier.

BACKGROUND

A database, such as a relational database, can store data in a tabular format, where each row in a table is an entry of data (e.g., record) in the table and includes a value for one or more columns defined for the table. Each row can be uniquely identified by a primary key. A primary key can include one or more fields, with the value(s) of the one or more fields for a given record being unique within the table. When a new record is added to a table, value(s) for the primary key field(s) can be provided. When a record is to be retrieved (e.g., using a query), value(s) for the primary key field(s) can be provided so that the record can be located.

SUMMARY

The present disclosure involves systems, software, and computer implemented methods for generating a unique hash identifier. One example method includes: identifying a record to be included in a database table, the record associated with two or more primary key fields, wherein the two or more primary key fields are concatenated to create a concatenated key value, and wherein the database table includes one or more hash columns for storing hash identifiers (IDs) associated with each record, wherein each hash ID includes a hash value and a counter value; applying a hash function to the concatenated key value to create a new hash value corresponding to the identified record; determining whether at least one existing record in the database table has a hash value matching the new hash value; determining whether the concatenated key value matches a concatenated key value of one or more existing records; in response to determining that a hash value of at least one existing record matches the new hash value and the concatenated key value of the identified record does not match the concatenated key value of any of the existing records, determining that a hash collision occurs and adding a counter to the new hash value to generate a unique hash ID; and storing the record in the database table, wherein the record includes the unique hash ID in the one or more hash columns.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

A record in a database table can be uniquely identified by a primary key. For some database tables, a single field may not be sufficient for providing uniqueness as a primary key. Accordingly, some database tables can use a multiple-field primary key, such as a string value that is generated from concatenating multiple fields into a single string value. A multiple-field primary key can be a value that includes a large number (e.g., greater than one hundred, several hundred) of bytes, such was when several fields are included in the multiple-field primary key and/or when some or all of the fields in the multiple-field primary key are text fields which include multiple characters. A large multiple-field primary key can result in a high amount of memory usage as compared, for example, to a single-field or non-text primary key, such as in indexing, concurrency control, queries, and other usage.

As an alternative to a multiple-field primary key, a hashed key (e.g., hash identifier) can be used that is generated from the multiple fields that might otherwise have been used as a multiple-field primary key. The hashed key can be, for example, a four-byte (or other-sized) integer value that can consume much less space in memory than a multiple-field primary key. When using hashed keys, hash collisions can occur. When a hash collision occurs, a counter value can be added to the hashed key to ensure that the hashed key is unique.

In addition to a lower space consumption in memory, a lower space consumption can result on disk for storage of database log and data. A lower memory footprint for a hashed key can occur in the storage of hash key data in database tables and also during processing in runtime data structures. One example runtime data structure is locking data used for storing record level locking information for transactions. Another example of data structures that can become smaller through the use of hashed keys are internal mappings that are used during join query processing. In addition to reduced memory consumption, hashed keys can improve performance of storage and retrieval of these example (and other) runtime data structures.

Figure 1:
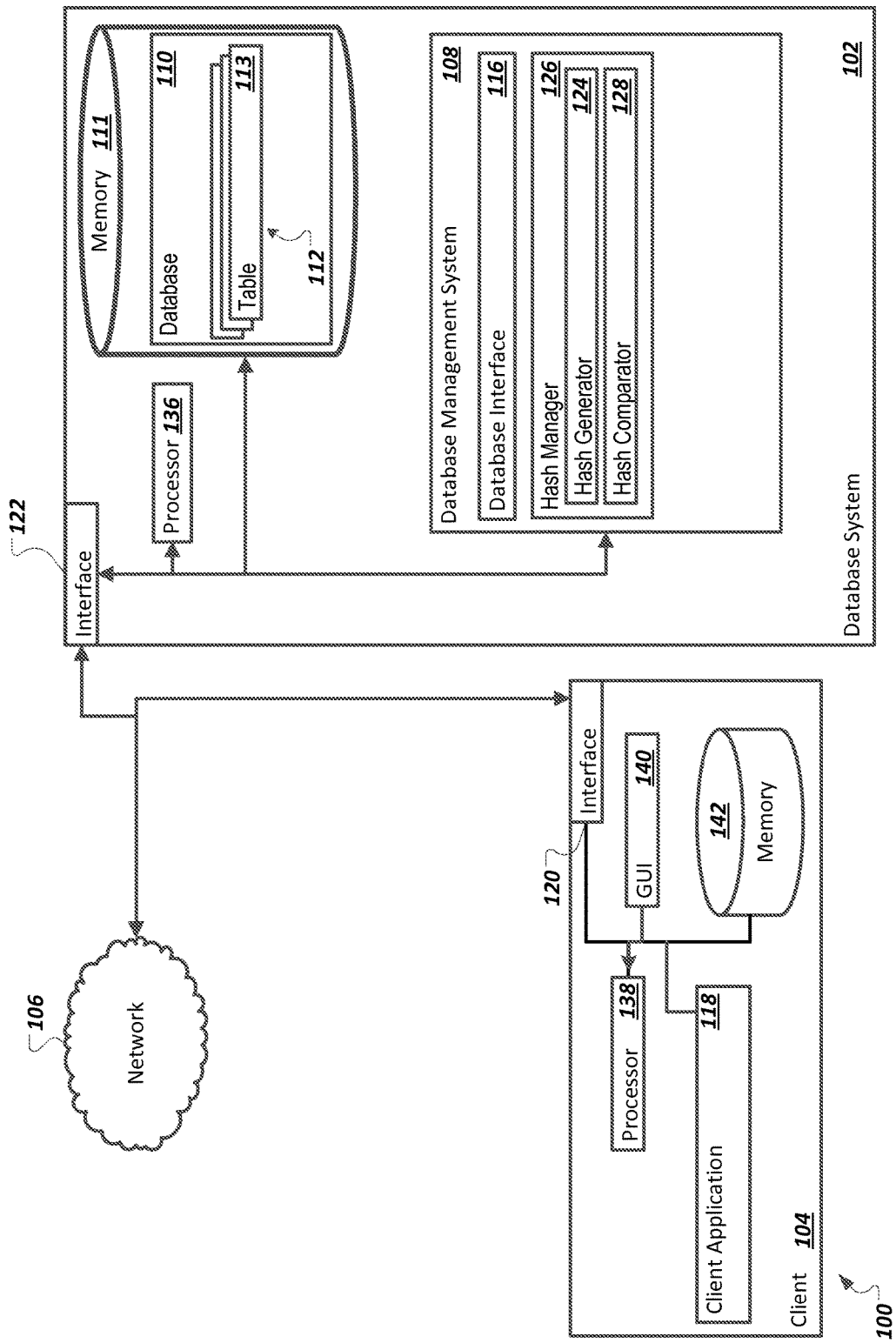
FIG. 1 is a block diagram illustrating an example system for generating a unique hash identifier.

FIG. 1 is a block diagram illustrating an example system 100 for generating a unique hash identifier. Specifically, the illustrated system 100 includes or is communicably coupled with a database system 102, a client device 104, and a network 106. Although shown separately, in some implementations, functionality of two or more systems or servers may be provided by a single system or server. In some implementations, the functionality of one illustrated system or server may be provided by multiple systems or servers.

The database system 102 includes a database management system 108. The database management system 108 manages a database 110 which includes a set of tables 112 (including a table 113) and other objects. The database 110 can be, for example, a relational database or some other type of database. In some implementations, the database 110 is an in-memory database (e.g., data associated with the database 110 may reside in main memory 111). The database management system 108 includes a database interface 116, which can be used, for example, by a client application 118 included in the client device 104, to interface with the database management system 108.

The client device 104 can, for example, send a SQL query to the database system 102 using a network interface 120. The database system 102 can receive the SQL query using a network interface 122. Alternatively, the client application 118 may initiate the SQL query via remote access to the database system 102. The received SQL query can be provided to the database interface 116.

The SQL query can be, for example, an INSERT, UPDATE, or DELETE operation. For example, when the SQL query is an INSERT operation, the SQL query can include field values to include in a new record to be inserted into the table 113. The field values can include values for primary key fields and for non-primary key fields.

The table 113 can include one or more hash columns for storing hash identifiers associated with each record. A hash identifier for a given record is distinct from other hash identifiers included in the table 113. A hash identifier includes a hash value and a counter value.

A hash generator 124 included in a hash manager component 126 can generate a hash identifier for the record to be inserted into the table 113. For example, the hash generator 124 can generate a concatenated key value which is a concatenation of the primary key field values included in the SQL INSERT query. The hash generator 124 can apply a hash function to the concatenated key value to create a new hash value corresponding to the record to be inserted.

A hash comparator 128 can determine whether a hash collision occurs between the new hash value for the record to be inserted and one or more hash values associated with one or more existing records in the table 113. When a hash collision does not occur, the record is inserted into the table 113 with a hash identifier that includes the new hash value.

When the new hash value matches one or more hash values associated with one or more existing records, the hash comparator 128 can determine whether the concatenated key value for the record to be inserted matches a concatenated key value of the one or more existing records. When the concatenated key value for the record to be inserted matches a concatenated key value of one or more existing records, the database management system 108 can return an error to the client application 118 due to a primary key violation (e.g., the client application 118 can be informed that it is attempting to insert a record that has the same primary key as an existing record in the table 113). When the new hash value matches one or more hash values associated with one or more existing records and the concatenated key value for the record to be inserted does not match a concatenated key value of the one or more existing records, a hash collision is detected and the hash generator 124 can add a counter to the new hash value to generate a hash identifier that uniquely identifies the record to be inserted. The record can be inserted into the table 113 with the hash identifier included in the one or more hash columns of the table 113.

As used in the present disclosure, the term "computer" is intended to encompass any suitable processing device. For example, although FIG. 1 illustrates a single database system 102 and a single client device 104, the system 100 can be implemented using a single, stand-alone computing device, two or more database systems 102, or two or more clients 104. Indeed, the database system 102 and the client device 104 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the database system 102 and the client device 104 may be adapted to execute any operating system, including Linux, UNIX, Windows, Mac OS®, Java™, Android™, iOS or any other suitable operating system. According to one implementation, the database system 102 may also include or be communicably coupled with an e-mail server, a Web server, a caching server, a streaming data server, and/or other suitable server.

The network interfaces 120 and 122 are used by the database system 102 and the client device 104, respectively, for communicating with other systems in a distributed environment—including within the system 100—connected to the network 106. Generally, the network interfaces 120 and 122 each comprise logic encoded in software and/or hardware in a suitable combination and operable to communicate with the network 106. More specifically, the network interfaces 120 and 122 may each comprise software supporting one or more communication protocols associated with communications such that the network 106 or interface's hardware is operable to communicate physical signals within and outside of the illustrated system 100.

The database system 102 includes one or more processors 136. Each processor 136 may be a central processing unit (CPU), a blade, an application specific integrated circuit (ASIC), a field-programmable gate array (FPGA), or another suitable component. Generally, each processor 136 executes instructions and manipulates data to perform the operations of the database system 102. Specifically, each processor 136 executes the functionality required to receive and respond to requests from the client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The database system 102 includes the memory 111. In some implementations, the database system 102 includes multiple memories. The memory 111 may include any type of memory or database module and may take the form of volatile and/or non-volatile memory including, without limitation, magnetic media, optical media, random access memory (RAM), read-only memory (ROM), removable media, or any other suitable local or remote memory component. The memory 111 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the database system 102.

The client device 104 may generally be any computing device operable to connect to or communicate with the database system 102 via the network 106 using a wireline or wireless connection. In general, the client device 104 comprises an electronic computer device operable to receive, transmit, process, and store any appropriate data associated with the system 100 of FIG. 1. The client device 104 can include one or more client applications, including the application 118. A client application is any type of application that allows the client device 104 to request and view content on the client device 104. In some implementations, a client application can use parameters, metadata, and other information received at launch to access a particular set of data from the database system 102. In some instances, a client application may be an agent or client-side version of the one or more enterprise applications running on an enterprise server (not shown).

The client device 104 further includes one or more processors 138. Each processor 138 included in the client device 104 may be a central processing unit (CPU), an application specific integrated circuit (ASIC), a field-programmable gate array (FPGA), or another suitable component. Generally, each processor 138 included in the client device 104 executes instructions and manipulates data to perform the operations of the client device 104. Specifically, each processor 138 included in the client device 104 executes the functionality required to send requests to the database system 102 and to receive and process responses from the database system 102.

The client device 104 is generally intended to encompass any client computing device such as a laptop/notebook computer, wireless data port, smart phone, personal data assistant (PDA), tablet computing device, one or more processors within these devices, or any other suitable processing device. For example, the client device 104 may comprise a computer that includes an input device, such as a keypad, touch screen, or other device that can accept user information, and an output device that conveys information associated with the operation of the server 102, or the client device 104 itself, including digital data, visual information, or a graphical user interface (GUI) 140.

The GUI 140 of the client device 104 interfaces with at least a portion of the system 100 for any suitable purpose, including generating a visual representation of the client application 118. In particular, the GUI 140 may be used to view and navigate various Web pages. Generally, the GUI 140 provides the user with an efficient and user-friendly presentation of business data provided by or communicated within the system. The GUI 140 may comprise a plurality of customizable frames or views having interactive fields, pull-down lists, and buttons operated by the user. The GUI 140 contemplates any suitable graphical user interface, such as a combination of a generic web browser, intelligent engine, and command line interface (CLI) that processes information and efficiently presents the results to the user visually.

Memory 142 included in the client device 104 may include any memory or database module and may take the form of volatile or non-volatile memory including, without limitation, magnetic media, optical media, random access memory (RAM), read-only memory (ROM), removable media, or any other suitable local or remote memory component. The memory 142 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of client devices 104 associated with, or external to, the system 100. For example, while the illustrated system 100 includes one client device 104, alternative implementations of the system 100 may include multiple client devices 104 communicably coupled to the database system 102 and/or the network 106, or any other number suitable to the purposes of the system 100. Additionally, there may also be one or more additional client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the client device 104 is described in terms of being used by a single user, this disclosure contemplates that many users may use one computer, or that one user may use multiple computers.

Figure 2:
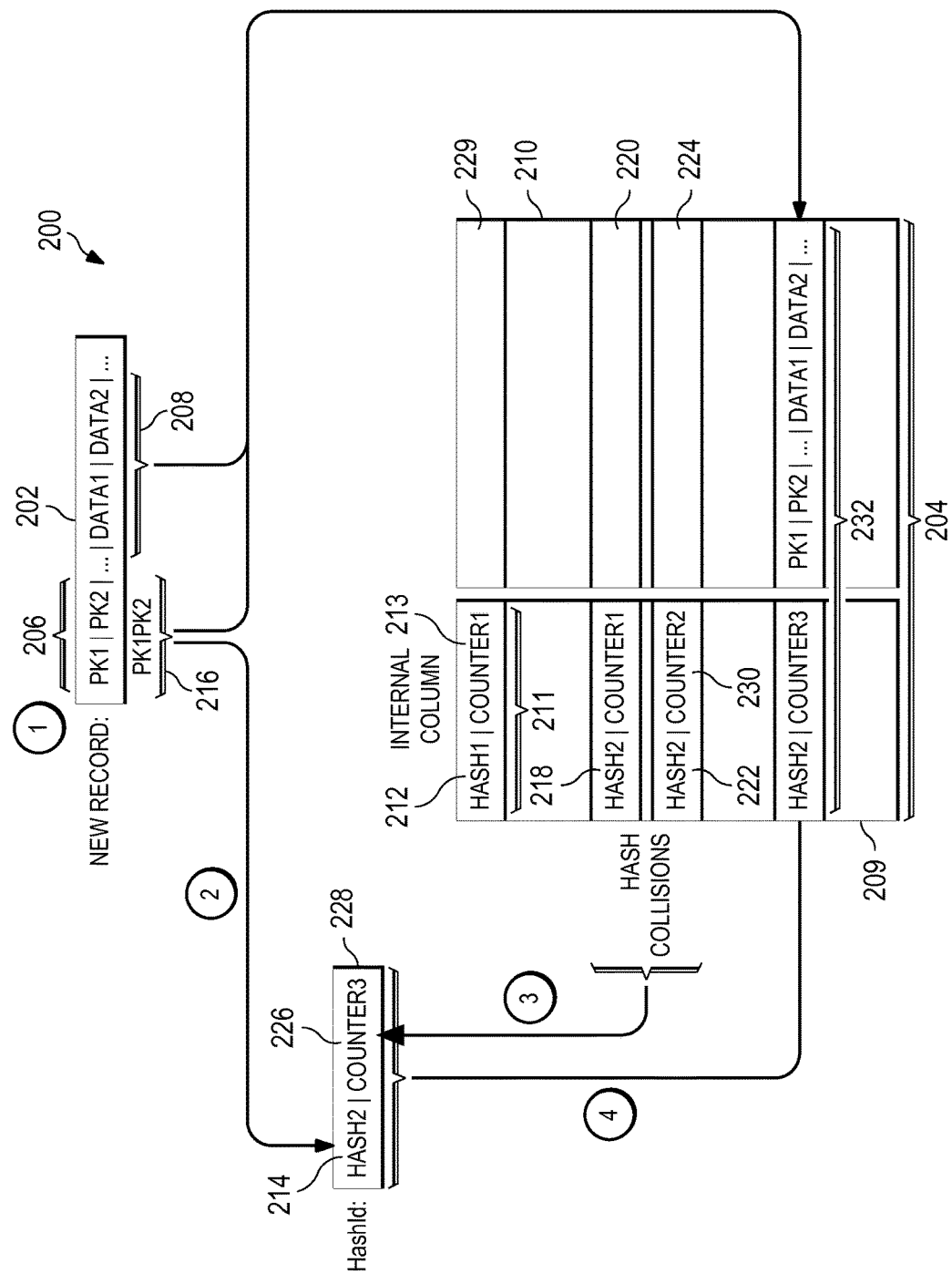
FIG. 2 illustrates the adding of an example new record to an example database table.

FIG. 2 illustrates the adding of an example new record 202 to an example database table 204. In a first stage, the record 202 that is to be included in the database table 204 is identified. The record 202 includes multiple primary key fields 206 (e.g., "PK1", "PK2") and other data fields 208 (e.g., "DATA1", "DATA2"). Three or more primary key fields may be used in alternative examples.

The database table 204 includes an internal hash column 209 and other columns 210. The internal hash column 209 stores hash identifiers, such as a hash identifier 211. The hash identifier 211 includes a hash value 212 (e.g., "HASH1") and a counter value 213 (e.g., "COUNTER1").

In a second stage, a hash value 214 (e.g., "HASH2") is generated for the record 202. For example, the hash value 214 can be the output of a hash function. The hash function can be, for example, a software hash function accessed from a library or a hardware hash function. The hash value 214 can be generated from a concatenated key value 216 which is the concatenation of the values of the multiple primary key fields 206 (e.g., "PK1PK2"). The hash function used to generate hash value 214 can be the same hash function used to generate the hash values associated with various entries in the database table 204.

In a third stage, a determination is made as to whether at least one existing record in the database table 204 has a hash value matching the hash value 214. For example, suppose that a hash value 218 (e.g., "HASH2") associated with an existing record 220 and a hash value 222 (e.g., "HASH2") associated with an existing record 224 both match the hash value 214.

When a hash value of an existing record matches the hash value 218, a determination can be made as to whether a primary key violation exists. For example, a determination can be made as to whether the concatenated key value 216 (non-hashed) matches a concatenated key value (non-hashed) of one or more existing records in the database table 204. When a primary key violation occurs, an error message can be generated.

When a hash value of an existing record matches the hash value 218 but no primary key violation occurs, a hash collision is detected and a counter value 226 can be added to the hash value 216 to generate a unique hash identifier 228. For example, a maximum counter value associated with the records 220 and 224 that collide with the new record 202 can be determined. For example, a maximum counter value 230 (e.g., "COUNTER2") can be determined to be the maximum counter value associated with records that collide with the record 202. The counter value 226 can be set to a value equal to the maximum counter value 230 plus a predefined increase interval (e.g., one). For example, the maximum counter value 230 can have a value of two and the counter value 226 (which becomes a new maximum counter value) can have a value of three. Accordingly, the hash identifier 228, which includes the hash value 214 and the new maximum counter value 226, is distinct from other hash identifiers included in the database table 204.

A set of unique counter values can be maintained for a set of records that share a common hash value. For example, a first set of records that each include a same, first hash value can be associated with counter values of 1, 2, 3, etc., and a second set of records that each include a same, second hash value (e.g., where the second hash value is different from the first hash value) can be associated with the same counter values of 1, 2, 3, etc. Accordingly, two or more records in the database table 204 can include a same counter value (e.g., a record 229 includes the same counter value (e.g., "COUNTER1") as the record 220). As another example, a set of counter values can be maintained per table, with each counter value associated with the table being unique.

In a fourth stage, the record 202 is stored as a new record 232 in the database table 204. The record 232 includes the primary key fields 206, the other data fields 208, and the hash identifier 228 (e.g., in the internal hash column 209).

The record 202 is also inserted into the database table 204 when no hash collision occurs. When no hash collision occurs, the counter value 226 can have a default value (e.g., zero, one).

Figure 3:
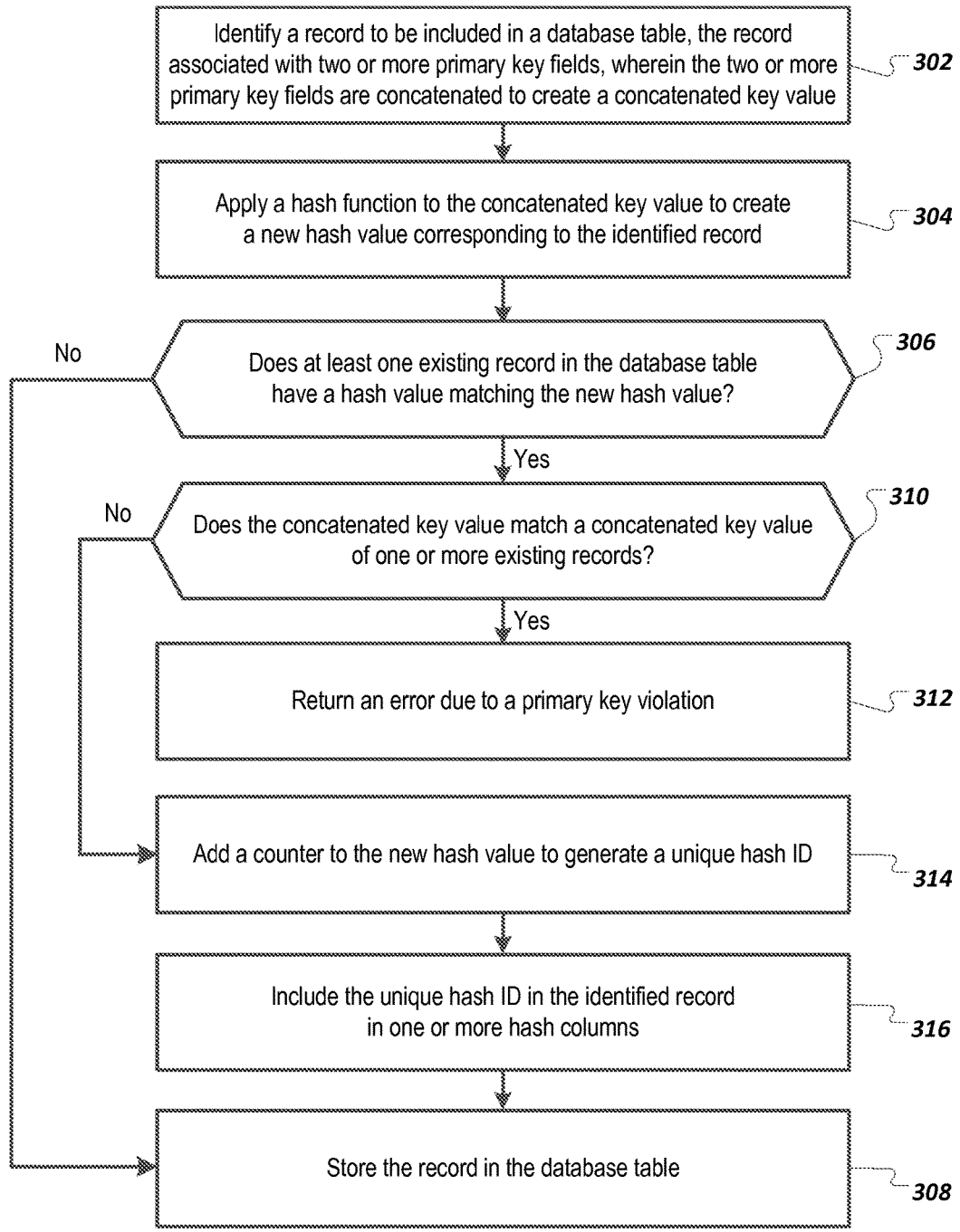
FIG. 3 is a flowchart of an example method for inserting a record into a database table.

FIG. 3 is a flowchart of an example method 300 for inserting a record into a database table. It will be understood that method 300 and related methods may be performed, for example, by any suitable system, environment, software, and hardware, or a combination of systems, environments, software, and hardware, as appropriate. For example, one or more of a client, a server, or other computing device can be used to execute method 300 and related methods and obtain any data from the memory of a client, the server, or the other computing device. In some implementations, the method 300 and related methods are executed by one or more components of the system 100 described above with respect to FIG. 1. For example, the method 300 and related methods can be executed by the database system 102 of FIG. 1.

At 302, a record to be included in a database table is identified. As described in more detail below, the database table includes one or more hash columns for storing hash identifiers (IDs) associated with each record and each hash ID includes a hash value and a counter value. The identified record can be a record to add (e.g., insert) to the database table. The record is associated with two or more primary key fields. For example, the combination of values for the two or more primary key fields in the identified record can be unique within the database table. The two or more primary key fields can be concatenated to create a concatenated key value.

At 304, a hash function is applied to the concatenated key value to create a new hash value corresponding to the identified record. The hash function can be, for example, a CRC32 (32-bit Cyclic Redundancy Check) hash function. The hash function can be accessed, for example, from a library. As another example, the hash function may be a hardware-based hash function.

At 306, a determination is made as to whether at least one existing record in the database table has a hash value matching the new hash value. As mentioned above, the database table includes one or more hash columns for storing hash IDs associated with each record and each hash ID includes a hash value and a counter value. In some implementations, the database table includes a first hash column for storing hash values and a second hash column for storing counter values. A determination as to whether at least one existing record in the database table has a hash value matching the new hash value can be made by determining whether one or more rows in the database table include the new hash value in the first hash column.

In some implementations, the database table includes a single hash column for storing hash IDs, with each hash ID in the single hash column storing both a hash value and a counter value. A determination as to whether at least one existing record in the database table has a hash value matching the new hash value can be made by extracting hash values from hash IDs to determine whether any extracted hash value matches the new hash value. A hash value can be extracted from a hash ID, for example, by retrieving a certain portion (e.g., highest-level bits, lowest-level bits) from the hash ID. As another example, a prefix search can be performed which searches for records which have a beginning portion of the hash ID equal to the new hash value.

When no existing records in the database table have a hash value matching the new hash value, the record is stored, at 308, in the database table. The new hash value is included in a hash ID that is stored in the one or more hash columns. In some implementations, a default counter value (e.g., zero) is stored as the counter value in the hash ID.

When at least one existing record in the database table has a hash value matching the new hash value, a determination is made, at 310, as to whether the concatenated key value matches a concatenated key value of one or more existing records. For example, the existing records of the database table can be processed and a concatenated key value can be generated for each existing record and compared to the concatenated key value for the identified record.

When the concatenated key value matches a concatenated key value of one or more existing records, an error is returned, at 312, due to a primary key violation.

When the concatenated key value does not match a concatenated key value of any existing records, a hash collision occurs and a counter is added, at 314, to the new hash value to generate a unique hash ID. For example, a maximum counter value in a hash ID associated with the one or more existing records that collide with the identified record can be identified. The counter for the new hash value can be modified (e.g., incremented) by a predefined increased interval (e.g., one) above the maximum counter value. The modified counter can be added to the new hash value to generate the unique hash ID.

At 316, the unique hash ID is included in the identified record in one or more hash columns. At 308, the record including the unique hash ID is stored in the database table.

Figure 4:
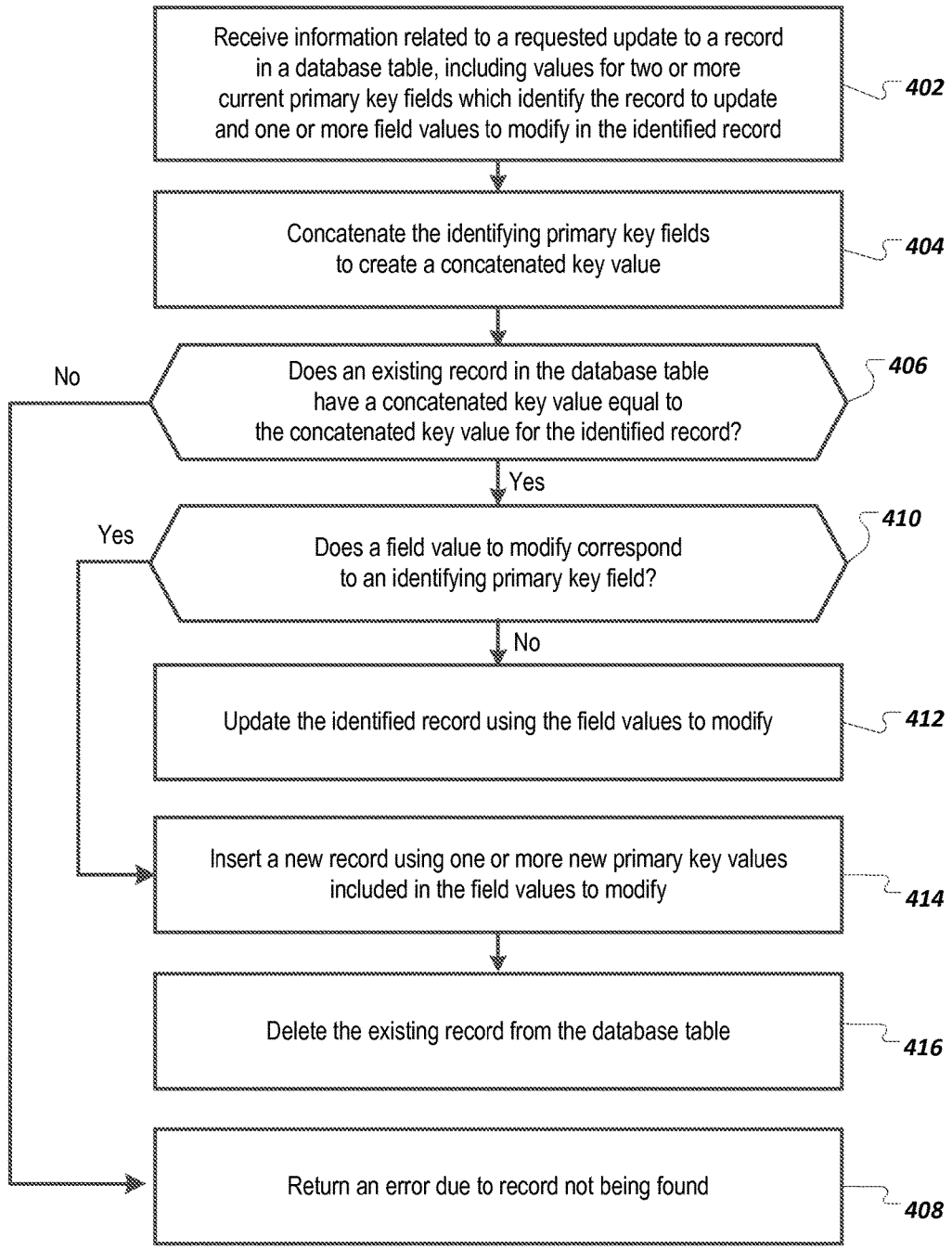
FIG. 4 is a flowchart of an example method for updating a record in a database table.

FIG. 4 is a flowchart of an example method 400 for updating a record in a database table. It will be understood that method 400 and related methods may be performed, for example, by any suitable system, environment, software, and hardware, or a combination of systems, environments, software, and hardware, as appropriate. For example, one or more of a client, a server, or other computing device can be used to execute method 400 and related methods and obtain any data from the memory of a client, the server, or the other computing device. In some implementations, the method 400 and related methods are executed by one or more components of the system 100 described above with respect to FIG. 1. For example, the method 400 and related methods can be executed by the database system 102 of FIG. 1.

At 402, information related to a requested update to a record in a database table is received. The information includes values for two or more current primary key fields which identify the record to update. The information also includes one or more field values to modify in the identified record. The field values to modify can correspond to primary key fields and/or non-primary key fields.

At 404, the current primary key fields are concatenated to create a concatenated key value.

At 406, a determination is made as to whether an existing record in the database table has a concatenated key value equal to the concatenated key value for the identified record.

When an existing record in the database table does not have a concatenated key value equal to the concatenated key value for the identified record, an error is returned, at 408, due to the record to update not being found.

When an existing record in the database table has a concatenated key value equal to the concatenated key value for the existing record, a determination is made, at 410, as to whether a field value to modify corresponds to a primary key field.

When no field values to modify correspond to a primary key field, the identified record is updated, at 412, using the field values to modify.

When one or more field values to modify correspond to a primary key field, a new record is inserted, at 414, using one or more new primary key values included in the field values to modify. The new record can be inserted, for example, as described above for process 300.

At 416, the existing record is deleted from the database table. The existing record can be identified, for example, using the current primary key fields.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method comprising:
   identifying a record to be included in a database table, the record associated with two or more primary key fields, wherein the two or more primary key fields are concatenated to create a concatenated key value, and wherein the database table includes one or more hash columns for storing hash identifiers (IDs) associated with each record, wherein each hash ID includes a hash value and a counter value;
   applying a hash function to the concatenated key value of the identified record to create a new hash value corresponding to the identified record;
   determining whether at least one existing record in the database table has a hash value matching the new hash value; and
   in response to determining that at least one existing record in the database table has a hash value matching the new hash value:
      determining whether the concatenated key value of the identified record matches a concatenated key value of one or more existing records; and
      in response to determining that the concatenated key value of the identified record does not match a concatenated key value of any of the existing records:
         adding a counter to the new hash value to generate a unique hash ID, wherein the unique hash ID includes the counter and the new hash value; and
         storing the record in the database table, wherein the record includes the unique hash ID in the one or more hash columns.

2. The method of claim 1, wherein the hash function is a CRC32 function.

3. The method of claim 1, further comprising, in response to determining that the concatenated key value of the identified record matches a concatenated key value of one or more existing records, returning an error due to a primary key violation.

4. The method of claim 1, wherein the one or more hash columns comprise an internal column within the database table.

5. The method of claim 1, wherein adding a counter to the new hash value to generate a unique hash ID includes:
   identifying a maximum counter value in a hash ID associated with the one or more existing records;
   modifying the counter for the new hash value by a predefined increased interval above the maximum counter value; and
   adding the modified counter to the new hash value.

6. The method of claim 1, further comprising, in response to determining that none of existing records in the database table has a hash value matching the new hash value, adding a default counter to the new hash value to generate a unique hash identifier.

7. The method of claim 1, wherein identifying a record to be included in a database table comprises identifying an INSERT or UPDATE structured query language (SQL) operation.

8. A computer program product encoded on a non-transitory storage medium, the product comprising non-transitory, computer readable instructions for causing one or more processors to perform operations comprising:
   identifying a record to be included in a database table, the record associated with two or more primary key fields, wherein the two or more primary key fields are concatenated to create a concatenated key value, and wherein the database table includes one or more hash columns for storing hash identifiers (IDs) associated with each record, wherein each hash ID includes a hash value and a counter value;
   applying a hash function to the concatenated key value of the identified record to create a new hash value corresponding to the identified record;
   determining whether at least one existing record in the database table has a hash value matching the new hash value; and
   in response to determining that at least one existing record in the database table has a hash value matching the new hash value:

determining whether the concatenated key value of the identified record matches a concatenated key value of one or more existing records; and in response to determining that the concatenated key value of the identified record does not match a concatenated key value of any of the existing records:

adding a counter to the new hash value to generate a unique hash ID, wherein the unique hash ID includes the counter and the new hash value; and storing the record in the database table, wherein the record includes the unique hash ID in the one or more hash columns.

9. The product of claim 8, wherein the hash function is a CRC32 function.

10. The product of claim 8, the operations further comprising, in response to determining that the concatenated key value of the identified record matches a concatenated key value of one or more existing records, returning an error due to a primary key violation.

11. The product of claim 8, wherein the one or more hash columns comprise an internal column within the database table.

12. The product of claim 8, wherein adding a counter to the new hash value to generate a unique hash ID includes:
   identifying a maximum counter value in a hash ID associated with the one or more existing records;
   modifying the counter for the new hash value by a predefined increased interval above the maximum counter value; and
   adding the modified counter to the new hash value.

13. The product of claim 8, further comprising, in response to determining that none of existing records in the database table has a hash value matching the new hash value, adding a default counter to the new hash value to generate a unique hash identifier.

14. The product of claim 8, wherein identifying a record to be included in a database table comprises identifying an INSERT or UPDATE structured query language (SQL) operation.

15. A system comprising:
   one or more computers associated with a database system; and
   a computer-readable medium coupled to the one or more computers having instructions stored thereon which, when executed by the one or more computers, cause the one or more computers to perform operations comprising:
      identifying a record to be included in a database table, the record associated with two or more primary key fields, wherein the two or more primary key fields are concatenated to create a concatenated key value, and wherein the database table includes one or more hash columns for storing hash identifiers (IDs) associated with each record, wherein each hash ID includes a hash value and a counter value;
      applying a hash function to the concatenated key value of the identified record to create a new hash value corresponding to the identified record;
      determining whether at least one existing record in the database table has a hash value matching the new hash value; and
      in response to determining that at least one existing record in the database table has a hash value matching the new hash value:
         determining whether the concatenated key value of the identified record matches a concatenated key value of one or more existing records; and
         in response to determining that the concatenated key value of the identified record does not match a concatenated key value of any of the existing records:
            adding a counter to the new hash value to generate a unique hash ID, wherein the unique hash ID includes the counter and the new hash value; and
            storing the record in the database table, wherein the record includes the unique hash ID in the one or more hash columns.

16. The system of claim 15, the operations further comprising, in response to determining that the concatenated key value of the identified record matches a concatenated key value of one or more existing records, returning an error due to a primary key violation.

17. The system of claim 15, wherein the one or more hash columns comprise an internal column within the database table.

18. The system of claim 15, wherein adding a counter to the new hash value to generate a unique hash ID includes:
   identifying a maximum counter value in a hash ID associated with the one or more existing records;
   modifying the counter for the new hash value by a predefined increased interval above the maximum counter value; and
   adding the modified counter to the new hash value.

19. The system of claim 15, further comprising, in response to determining that none of existing records in the database table has a hash value matching the new hash value, adding a default counter to the new hash value to generate a unique hash identifier.

20. The system of claim 15, wherein identifying a record to be included in a database table comprises identifying an INSERT or UPDATE structured query language (SQL) operation.

* * * * *